No. 609,794. Patented Aug. 30, 1898.
D. CROWTHER.
RUBBER TIRE.
(Application filed June 6, 1898.)
(No Model.)
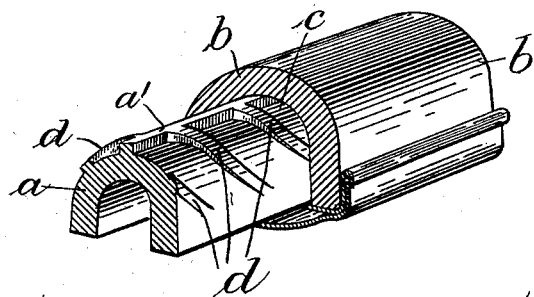
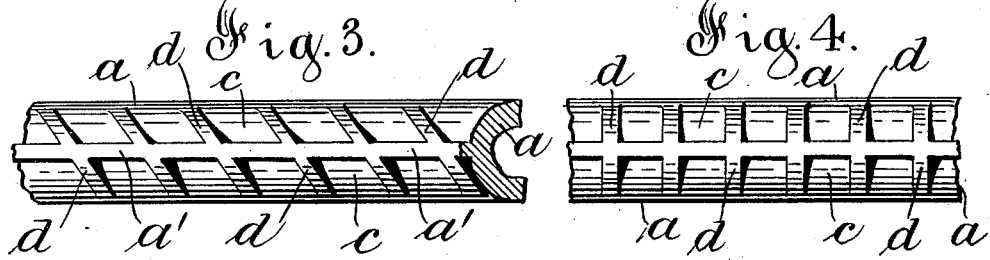
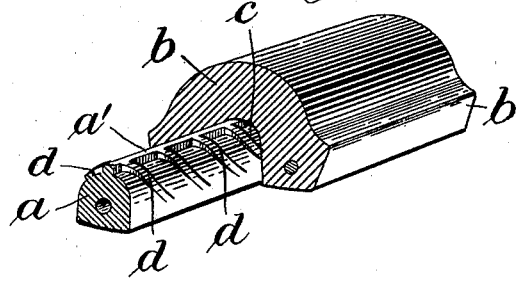
Witnesses:
J. Spragg Poole
George H. Blis
Inventor:
David Crowther.
by Hubert W. T. Jenner.
Attorney.
THE NORRIS PETERS CO., PHOTO-LITHO., WASHINGTON, D. C.

UNITED STATES PATENT OFFICE.

DAVID CROWTHER, OF HUDDERSFIELD, ENGLAND.

RUBBER TIRE.

SPECIFICATION forming part of Letters Patent No. 609,794, dated August 30, 1898.

Application filed June 6, 1898. Serial No. 682,624. (No model.)

*To all whom it may concern:*

Be it known that I, DAVID CROWTHER, a subject of the Queen of Great Britain, residing at Milnsbridge, Huddersfield, in the county of York, England, have invented certain new and useful Improvements in Rubber Tires for Velocipede, Vehicle, and other Wheels; and I do hereby declare the following to be a full, clear, and exact description of the invention, such as will enable others skilled in the art to which it appertains to make and use the same.

This invention relates to improvements on the tire shown at Figure 1 on the drawings annexed to the specification of United States Letters Patent No. 580,255, granted on the 6th day of April, 1896.

The object of my present improvements is to provide additional bearing-surfaces or support for the outer arch or member of the tire in order to further reinforce or give greater resistance to the load the tire is to carry, especially at the sides of the tire, such side support or bearing-surfaces likewise reducing liability to side slip.

To the aforesaid purpose my invention consists in the novel and peculiar construction of the tire, as hereinafter fully described.

In the accompanying drawings, illustrating my invention, Fig. 1 is a sectional perspective elevation of a cycle-tire embodying my improvements. Fig. 2 is a similar elevation of a vehicle-tire embodying my improvements. Fig. 3 is a plan view of the inner member or arch. Fig. 4 is a plan view of the inner member or arch, showing a modified construction.

Referring to the drawings, letter $a$ designates the inner arch or member of the tire; $a'$, the central bead or rib on the apex thereof and integral therewith; $b$, the outer arch or member, surrounding the top and sides of the inner arch $a$ and bearing upon the central bead or rib $a'$, which, particularly in vehicle-tires, may be solutioned to the said outer arch $b$, and $c$ $c$ are air-spaces between the two arches or members of the tire.

The above comprises the tire described and shown in my said United States Letters Patent No. 580,255; and my present improvements consist in providing radial or transverse ribs $d$ $d$, formed integral with the inner arch or member $a$ and curving on their outer surfaces to the radius of the inner walls of the outer arch or member, the extremities of said radial or transverse ribs dying away or tapering to nothing at the sides of the inner arch $a$. These transverse ribs $d$ $d$ are arranged at equal distances apart around the tire, the spaces between forming the air-spaces, and are formed at an angle to the central bead or rib $a'$, so that the extremity of one rib on one side of the inner arch $a$ is opposite or approximately opposite the extremity of the neighboring rib on the opposite side of the inner arch $a$, whereby a continued bearing-surface or reinforcement is given to the outer arch $b$ throughout its length.

The construction of the surface of the inner arch $a$ of the tire is exactly the same for vehicles or other wheels as for bicycle-wheels, as will be seen from Fig. 2, which is to all intents the same tire as shown at Fig. 1, though made stronger to carry heavier loads.

In Fig. 4 I show a modification of my improvements, the radial or transverse ribs $d$ $d$ being formed or arranged at right angles to the central bead or rib $a'$. The ribs $d$ $d$ support or reinforce the tire at short intervals at each side of the central bead or rib $a'$, which supports the tread only, and this reinforcement of the sides of the outer arch $b$, in addition to giving greater resistance to depression, also reduces liability to side slip.

I claim—

1. In tires for wheels, the combination with a double-arched tire, comprising an inner arched member having a central bead or rib on its apex, an outer arched member surrounding the top and sides of said inner arched member, and resting at its apex on the said central bead or rib, and air-spaces intermediate of the apices of said inner and outer arched members, of lateral or transverse ribs integral with the inner arched member and extending from the central bead on each side in arched curves coincident with the radius of the inner arched wall of the outer arched member of the tire and dying away into the sides of the inner arched member substantially as herein set forth.

2. In tires for wheels, the combination of an inner arched member provided at its apex with a central bead and extending therefrom on each side with lateral or transverse beads or ribs arranged at equal distances apart and at an angle to said central bead whereby the extremity of one transverse bead on one side is opposite the extremity of its neighboring rib on the opposite side, and an outer arched member surrounding the top and sides of said inner arched member and bearing or resting on the central and the transverse beads or ribs between which latter there are air-spaces, substantially as herein set forth.

In testimony whereof I affix my signature in presence of two witnesses.

DAVID CROWTHER.

Witnesses:
OWEN AVISON,
THOMAS H. BARRON.